No. 757,093. PATENTED APR. 12, 1904.
R. B. COLTRIN.
CEMENT MOLD.
APPLICATION FILED OCT. 22, 1903.
NO MODEL.
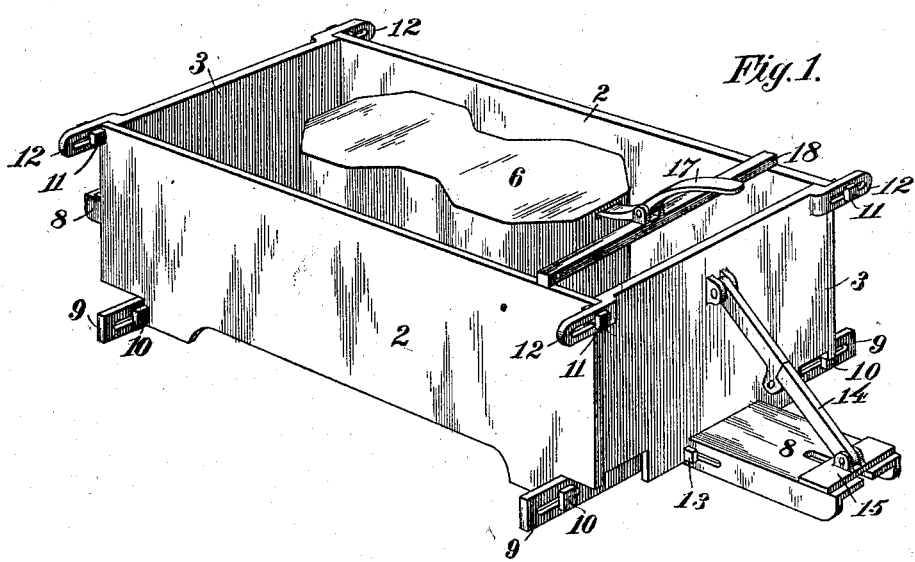
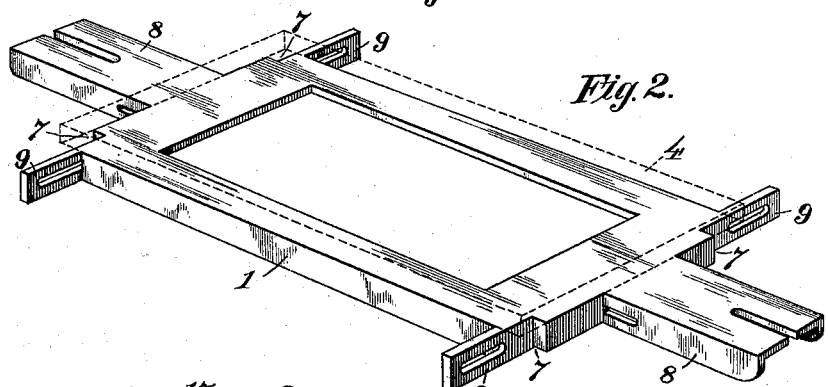
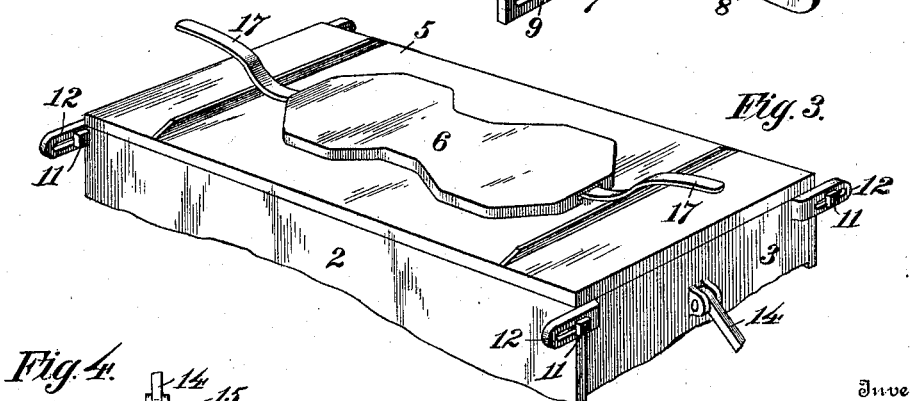
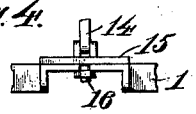
Witnesses
H. S. Austin
S. E. Dallinger
Inventor
Robert B. Coltrin
By Julian C. Dowell
his Attorneys.

No. 757,093.

Patented April 12, 1904.

UNITED STATES PATENT OFFICE.

ROBERT B. COLTRIN, OF JACKSON, MICHIGAN.

CEMENT-MOLD.

SPECIFICATION forming part of Letters Patent No. 757,093, dated April 12, 1904.

Application filed October 22, 1903. Serial No. 178,072. (No model.)

*To all whom it may concern:*

Be it known that I, ROBERT B. COLTRIN, a citizen of the United States, residing at Jackson, in the county of Jackson and State of Michigan, have invented certain new and useful Improvements in Cement-Molds; and I do hereby declare the following to be a full, clear, and exact description of the invention, such as will enable others skilled in the art to which it appertains to make and use the same.

My invention relates to molding apparatus for making stone or blocks from cement or other plastic material, and particularly to molds of that class having movable or separable sides and ends adapted to be closed or brought into position to form the shaping-receptacle for the plastic material and to be opened or removed to release the formed blocks or stones and permit their removal.

The principal objects are to provide an improved mold of this character simple and inexpensive in structure, efficient, and exceedingly convenient in use; to simplify and improve the connections and devices for holding the parts in molding position; to provide for nice adjustments of the sides and ends for squaring up the mold accurately to form perfectly even and exact blocks or stone, and to furnish improved means for molding hollow blocks or stone and for detaching the cores or inner forms employed for this purpose without liability of injuring the blocks.

The invention will first be described with reference to the accompanying drawings, which are to be taken as a part of this specification, and it will then be set forth more particularly in the annexed claims.

In said drawings, Figure 1 is a perspective view of a molding apparatus embodying my invention without the top plate usually employed in connection with the molding-receptacle represented. Fig. 2 is a perspective view of the base of said apparatus with the position of a superimposed auxiliary base or bottom preferably used indicated by dotted lines. Fig. 3 is a fragmentary perspective view of the upper part of the mold with the top plate mounted therein, showing the means for lifting out the core or inner form. Fig. 4 is a detail end view of the adjustable fastening of one of the end braces to the arm of the supporting-base.

The supporting-base of the illustrated apparatus is indicated by the numeral 1, and the sides are designated by the numerals 2 and 3, respectively. These parts when closed or held in operative position constitute the mold or cement receptacle, in which, however, a removable auxiliary bottom or board 4 (indicated by dotted lines in Fig. 2) is preferably fitted, so that the molded block or stone can be lifted and removed by and with said bottom. A top plate 5 is also usually employed for compressing the material and flattening its upper surface. The mold may of course be of different forms or configurations in accordance with the shape of the stone or block to be molded, which, however, is usually rectangular, wherefore the mold is represented of corresponding form and the sides and ends as flat rectangular plates. If a solid block or stone is to be made, the mold is of course left unobstructed inside; but if a hollow block is to be made any suitable core or inner form or a number of the same may be used—such, for example, as shown and designated by the symbol 6.

While the supporting-base 1 may be solid, it is shown in the form of a rectangular open frame the sides and ends of which are of angular construction, providing a flat upper border or supporting-surface and downturned edges or flanges, which is an advantageous structural feature combining lightness and strength. The ends of the base are also shown somewhat reduced in width, leaving cut-away portions at the corners, as indicated at 7, over which the corners of the auxiliary bottom or board 4 project. This is for the purpose of affording a convenient hold for lifting the board with the molded block thereon off the base, which is usually accomplished by means of hooks engaging under said corners. From the ends of the base project arms or narrow flat extensions 8, which for strength and lightness may be of similar construction to the main portion of the base, while from the sides near the corners extend short arms or lugs 9, the purposes of which will hereinafter appear.

In the illustrated apparatus the side plates 2 rest on the lateral arms or lugs 9. They abut against the ends or edges of the end plates 3, their lower parts abut against the sides of the base, and they are cut away at their lower corners or formed with depending parts, so as to fit between said arms or lugs, whereby the side plates are held in position against lengthwise displacement. The lower parts of said side plates are held tightly against the sides of the base or against the edges of the end plates by suitable devices inserted transversely through the arms or lugs 9, such as by bolts 10, tightened in slots in said arms or lugs, which thus permit of adjustment. The upper parts of the side plates are similarly held in place by bolts 11, inserted through slotted lugs 12, projecting from the end plates.

The end plates fit between the side plates and abut against the ends of the base, while their lugs 12 abut against the ends of said side plates. The lower parts of the end plates are intermediately cut away or formed with depending projections to fit over or at opposite sides of the arms or extensions 8, and they are held firmly against the ends of the base by bolts 13, inserted transversely through slots in said arms or extensions. To the outer ends of these arms or extensions are pivotally secured foldable or medially-hinged braces 14, also pivotally secured to the end plates, and said braces when straight, as represented in Fig. 1, hold the end plates rigidly in position. For the purposes of adjustment said braces are preferably connected to the arms by pivoting them to plates 15, adjustably secured thereon, as by means of threaded studs or bolts 16, depending through longitudinal slots in said arms and having fastening-nuts screwed thereon. (Illustrated in Fig. 4.)

The mold as thus described may be put together and squared up easily and quickly simply by setting the bolts 10, 11, 13, and 16 properly, raising the side plates or mounting them in vertical position, then raising the end plates to vertical position and straightening the braces 14, which thus lock the parts in molding position. The bolt-and-slot fastenings which hold the parts together permit of delicate adjustments for squaring up the mold accurately for forming blocks of exact shape and dimensions. This feature of adjustment is important in view of the slight variations in shapes or exactitudes of the side and end plates produced in casting.

When the mold is arranged in proper operative position, the prepared cement or plastic material is placed therein and rammed or packed as hard as desired, and further pressure may also be applied, and the upper surface of the material may be rendered smooth or flat by means of a top plate, on which a force may be exerted by any suitable means. The top plate may, however, be used or not, as the requirements or preferences of the workman may dictate. After the molded block or stone has been permitted to set sufficiently the top plate, if used, is removed, the braces 14 are doubled or folded, which causes the end plates to swing outward, thus releasing the upper parts of the side plates, which may likewise swing or move outward. The molded block may then be lifted by the auxiliary bottom or base and removed, and the mold may immediately be placed into molding position again simply by raising the side plates, then raising the end plates, and straightening or bearing down on the hinged braces. It will be observed that no disturbance of any of the bolts is necessary after they have once been set.

As before stated, if a hollow block is to be molded any appropriate core or cores may be used, and the same may be arranged and maintained in proper position on the auxiliary bottom or base 4 by suitable means—such, for example, as pins depending from the core or cores into apertures therefor in the board. I have illustrated in the present case an improved form of core (designated by the symbol 6) having the general outline of the figure 8, so as to impart a corresponding shape to the hollow or opening in the block. This renders the block substantially hollow at each half, but leaves thicker reinforced parts at the centers of the sides or between the greater hollow parts. The form of the hollow has also certain advantages in using the blocks for buildings or constructions.

As a simple and convenient means for lifting the core out of the molded block or stone short bent handles or levers 17 are shown in Fig. 1 inserted into notches or recesses in the opposite ends or faces of the core near its top. Said levers may rest on suitable supports, or, as shown, they may be fulcrumed to cross-bars 18, set across the top of the mold.

The top plate 5 (illustrated in Fig. 3) has an opening to receive or fit over the upper part of the core, which projects through or above the same, so that the handles or levers 17 engage the core above said top plate. To raise the core, the operator may bear down on the free ends of the levers, and the top plate may serve as a fulcrum or support, or, as illustrated, the top plate may be formed with cross-ribs which strengthen the same, prevent warping or breaking thereof, and which also serve as fulcrums for the levers.

It will be understood, of course, that the apparatus is susceptible of various modifications in details of construction and arrangement without departing from the scope of my invention—as, for example, the substitution of equivalent fastening devices or a change of the relations of the side and end members and the connections thereof.

Having thus fully described my invention, what I claim as new, and desire to secure by Letters Patent of the United States, is—

1. In a mold, a base and separable side and end members, and adjustable connections between said base and members and between the members for holding them in operative position, which connections permit adjustment of said members and are adapted to remain fixed or set after adjustment so as to permit separation of the members without disturbance or unfastening of said connections.

2. In a mold, a base and separable side and end members, set or relatively fixed connections between said base and members permitting detachment of the latter, and connections between said members for holding them in operative position.

3. In a mold, a base and separable side and end members set against its edges connected thereto at their lower parts, one corresponding pair of said members being interposed or fitted between the other pair, and connections between said members for holding them in operative position, said connections holding the outer pair of members from both inward and outward displacement, and means holding the inner pair of members in position and permitting separation thereof without unfastening said connections.

4. In a mold, a base and separable or outwardly-movable side and end members, one pair of said members having lugs or projections engaging the outer faces of the other members to hold them in operative position, whereby on outward movement of the former members the latter may also be moved outwardly, and means holding said former members in operative position and permitting outward movement thereof.

5. In a mold, a base having end and lateral projections or extensions, separable side and end members having cut-away portions or depending parts resting over or beside said projections, and bolts or equivalent devices adjustably secured in slots in said projections and engaging the outer faces of said members, and connections between said members for holding them in operative position.

6. In a mold, a base having end extensions or projections, side members, and separable or outwardly-movable end members, and foldable or intermediately-hinged braces between said end members and extensions adapted when straight to hold the members in raised position.

7. In a mold, a base, separable or outwardly-movable side and end members, one opposite pair of said members having foldable braces connected to them and to the base adapted when straight to hold said members in raised position, and connections between the braced members and the others for holding the latter also in raised position.

8. In a mold, a base having opposite projections or extensions, separable or outwardly-movable side and end members, and foldable braces between said extensions and the corresponding members, the latter being fitted between or within the other members and having lugs or projections engaging the outer sides of said other members.

9. In a mold, a base having end arms or extensions and lateral lugs or projections, side members resting on said lateral projections and having parts depending between or beside them and abutting against the sides of the base, end members resting on said end extensions having a cut-away portion thereover or depending parts beside said extensions and abutting against the ends of the base, bolts secured in slots in said lateral projections and end extensions or equivalent adjustable devices engaging the outer faces of said members to hold their lower parts in place, foldable or intermediately-hinged braces between said end members and extensions, and connections between said end and side members for holding the latter in vertical position with the end members.

10. In a mold, a base having end arms or extensions and lateral lugs or projections, side members resting on said lateral projections and having parts depending between or beside them and abutting against the sides of the base, end members interposed between or within the side members resting on said end extensions having a cut-away portion thereover or depending parts beside said extensions and abutting against the ends of the base, bolts secured in slots in said lateral projections and end extensions or equivalent adjustable devices engaging the outer faces of said members to hold their lower parts in place, foldable or intermediately-hinged braces between said end members and extensions, the connections of said braces to one of said parts being adjustable, and slotted lugs projecting from said end members and having bolts or equivalent devices secured therein and engaging the outer faces of said members.

11. In a mold, a receptacle for the material to be molded having an outwardly-movable door or member, and a foldable or intermediately-hinged brace between said member and the base of the receptacle, the connection to one of said parts being adjustable.

12. In a mold, a receptacle for the material to be molded having an outwardly-movable door or member, a foldable or intermediately-hinged brace pivotally connected to said member and an extension of the base, the connection to the latter comprising a plate to which said brace is pivoted having a depending fastening-bolt adjustably secured in a slot in said extension or equivalent fastening means.

In testimony whereof I affix my signature in presence of two witnesses.

ROBERT B. COLTRIN.

Witnesses:
MARY A. WILSON,
OSGOOD H. DOWELL.